US007669380B2

(12) United States Patent
Logan et al.

(10) Patent No.: US 7,669,380 B2
(45) Date of Patent: Mar. 2, 2010

(54) GLUE MANIFOLD FOR A FUNCTIONAL SHUTTER

(75) Inventors: Richard J. Logan, Oxford, MI (US); Jeff E. Schiedegger, Ann Arbor, MI (US); Nathan Greenway, Metamora, MI (US); Charles E. Schiedegger, Metamora, MI (US)

(73) Assignee: TAPCO International Corporation, Wixom, MI (US)

( * ) Notice: Subject to any disclaimer, the term of this patent is extended or adjusted under 35 U.S.C. 154(b) by 1075 days.

(21) Appl. No.: 11/326,098

(22) Filed: Jan. 5, 2006

(65) Prior Publication Data

US 2006/0174570 A1 Aug. 10, 2006

Related U.S. Application Data

(60) Provisional application No. 60/641,718, filed on Jan. 6, 2005.

(51) Int. Cl.
*E04C 5/00* (2006.01)
*B29C 37/00* (2006.01)

(52) U.S. Cl. ......................... 52/656.9; 52/473; 156/293

(58) Field of Classification Search ..................... 52/78, 52/127.3, 202, 455–457, 473, 659.9, 127.4, 52/745.21, 746.1; 49/61–64, 74.1, 92.1, 49/371, 403, 504; 156/65, 71, 293; 403/205, 403/252, 253, 254, 255, 331, 382, 403
See application file for complete search history.

(56) References Cited

U.S. PATENT DOCUMENTS 430,482 A * 6/1890 Lohse ......................... 52/455
2,116,584 A * 5/1938 Shelby ....................... 403/381
3,394,518 A * 7/1968 Worrell, Jr. .................. 52/473
3,638,383 A 2/1972 Ribas
3,797,186 A 3/1974 Smith
3,810,338 A 5/1974 Wolfert
3,932,959 A 1/1976 Jansons et al.
3,995,401 A * 12/1976 Smith ........................ 52/127.4
4,020,609 A 5/1977 Daniels
4,939,880 A * 7/1990 Wang .......................... 52/473

(Continued)

FOREIGN PATENT DOCUMENTS

DE 2646351 A1 * 12/1977

(Continued)

*Primary Examiner*—Robert J Canfield
*Assistant Examiner*—Babajide Demuren
(74) *Attorney, Agent, or Firm*—Howard & Howard Attorneys PLLC

(57) ABSTRACT

A shutter assembly mounts adjacent an opening of a building. The shutter assembly includes a right stile and a left stile disposed in a spaced and parallel opposing relationship with one another and each having a U-shaped cross section presenting a base and side walls. The side walls extend from the base to spaced distal edges to define a channel open at each end of the respective stiles. A top rail and a bottom rail extend in a spaced and parallel opposing relationship between the bases of the stiles. The top rail is disposed in one of the open ends of each of the stiles and the bottom rail is disposed in the other open ends of each of the stiles. Each of the rails define a glue manifold for distributing an adhesive onto the rails and into the channels for securing the rails to the stiles.

24 Claims, 5 Drawing Sheets

U.S. PATENT DOCUMENTS

| | | | | | |
|---|---|---|---|---|---|
| 4,945,969 | A | | 8/1990 | Schnebly et al. | |
| 4,965,030 | A | * | 10/1990 | Thorn | 264/46.5 |
| 5,392,577 | A | | 2/1995 | D'Onofrio, Jr. et al. | |
| 5,526,857 | A | | 6/1996 | Forman | |
| 5,584,154 | A | | 12/1996 | Koepke et al. | |
| 5,622,018 | A | | 4/1997 | Schiedegger | |
| 5,704,182 | A | | 1/1998 | Schiedegger | |
| 5,761,865 | A | | 6/1998 | Schiedegger | |
| 5,823,701 | A | * | 10/1998 | Goto | 403/268 |
| 5,848,505 | A | | 12/1998 | Taylor | |
| 5,906,451 | A | * | 5/1999 | Goto | 403/268 |
| 5,907,929 | A | * | 6/1999 | Poma et al. | 52/78 |
| 5,946,873 | A | | 9/1999 | Schiedegger et al. | |
| 6,023,905 | A | | 2/2000 | Schiedegger | |
| 6,073,412 | A | * | 6/2000 | Verch | 52/656.5 |
| 6,122,875 | A | | 9/2000 | Schiedegger et al. | |
| 6,128,857 | A | | 10/2000 | Morgan et al. | |
| 6,141,938 | A | | 11/2000 | Schiedegger | |
| 6,250,040 | B1 | * | 6/2001 | Green | 52/656.7 |
| 6,263,632 | B1 | | 7/2001 | Cadorette | |
| 6,314,680 | B1 | | 11/2001 | Buckwalter et al. | |
| 6,397,540 | B1 | | 6/2002 | Schiedegger | |
| 6,470,639 | B1 | | 10/2002 | Horn et al. | |
| 6,487,827 | B2 | | 12/2002 | Hollman | |
| 6,560,941 | B1 | | 5/2003 | French | |
| 6,604,322 | B2 | | 8/2003 | Horn et al. | |
| 6,622,433 | B2 | | 9/2003 | Blachley | |
| 6,817,141 | B2 | * | 11/2004 | Chen | 49/87.1 |
| 6,820,385 | B2 | | 11/2004 | Horn et al. | |
| 2001/0014250 | A1 | * | 8/2001 | Plummer et al. | 403/295 |
| 2002/0056230 | A1 | | 5/2002 | Horn et al. | |
| 2002/0056231 | A1 | | 5/2002 | Blachley | |
| 2002/0187293 | A1 | | 12/2002 | Schlenker | |
| 2002/0194804 | A1 | | 12/2002 | Horn et al. | |
| 2003/0115817 | A1 | | 6/2003 | Blackwell et al. | |
| 2003/0200715 | A1 | | 10/2003 | Blackwell et al. | |
| 2004/0003540 | A1 | | 1/2004 | Horn et al. | |
| 2004/0010988 | A1 | | 1/2004 | Jaycox et al. | |
| 2004/0068936 | A1 | | 4/2004 | Javaheri | |
| 2004/0172906 | A1 | | 9/2004 | Ballantyne | |
| 2004/0216418 | A1 | | 11/2004 | Stanchfield | |
| 2005/0022463 | A1 | | 2/2005 | Blackwell et al. | |
| 2005/0102963 | A1 | | 5/2005 | Nien et al. | |
| 2005/0210777 | A1 | | 9/2005 | Baughn et al. | |
| 2005/0235562 | A1 | * | 10/2005 | Hsu | 49/74.1 |
| 2006/0233600 | A1 | * | 10/2006 | Egli et al. | 403/294 |
| 2007/0039159 | A1 | * | 2/2007 | Galbreath et al. | 29/458 |
| 2007/0261787 | A1 | * | 11/2007 | Malis | 156/285 |

FOREIGN PATENT DOCUMENTS

| | | | | |
|---|---|---|---|---|
| EP | 610675 | A1 | * | 8/1994 |

* cited by examiner

GLUE MANIFOLD FOR A FUNCTIONAL SHUTTER

CROSS REFERENCE TO RELATED APPLICATION

This application claims the benefit of U.S. provisional application Ser. No. 60/641,718 filed Jan. 6, 2005.

BACKGROUND OF THE INVENTION

1. Field of the Invention

The invention relates to a shutter assembly for mounting adjacent an opening of a building.

2. Description of the Prior Art

A shutter assembly of the prior art typically includes a right stile and a left stile disposed in a spaced and parallel opposing relationship with one another. A top rail and a bottom rail extend in a spaced and parallel opposing relationship between the right and left stiles. An example of such a configuration is shown in U.S. Pat. No. 6,622,433 (the '433 patent) to Blachley. The shutter assembly disclosed in the '433 patent includes a right stile and a left stile disposed in a spaced and parallel opposing relationship with one another. Each of the stiles have a U-shaped cross section presenting a base and side walls. The side walls extend from the base to spaced distal edges to define a channel open at each end of the respective stiles. A top rail and a bottom rail extend in a spaced and parallel opposing relationship between the bases of the right and left stiles. An adhesive is disposed on the top and bottom rails for securing the rails to the stiles. The top rail is disposed in one of the open ends of each of the right and left stiles and the bottom rail is disposed in the other open ends of each of the right and left stiles. When the rails are inserted into the stiles the adhesive has a tendency to be removed and does not adequately cover the rails, thus creating a weak adhesive bond between the rails and the stiles.

Therefore, the top and bottom rails do not remain evenly coated with the adhesive and assemblies that are poorly adhered together are likely to fail. Plus, coating the rails with adhesive prior to inserting the rails into the stiles is a sticky and messy process.

SUMMARY OF THE INVENTION AND ADVANTAGES

The present invention provides for a shutter assembly for mounting adjacent an opening of a building. The shutter assembly includes a right stile and a left stile disposed in a spaced and parallel opposing relationship with one another and each having a U-shaped cross section presenting a base and side walls. The side walls of the right and left stiles extend from the base to spaced distal edges to define a channel open at each end of the respective stiles. A top rail and a bottom rail extend in a spaced and parallel opposing relationship between the bases of the right and left stiles. The top rail is disposed in one of the open ends of each of the right and left stiles and the bottom rail is disposed in the other open ends of each of the right and left stiles. Each of the top and bottom rails define a glue manifold for distributing an adhesive onto the top and bottom rails and into the channels for securing the rails to the stiles.

The present invention therefore provides for a top rail and a bottom rail each having a glue manifold that evenly distributes the adhesive onto the rails and into the channels of a right stile and a left stile to consistently create a strong bond between the rails and the stiles. Plus, the glue manifold provides for a clean and easy process for adhering the rails to the stiles.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
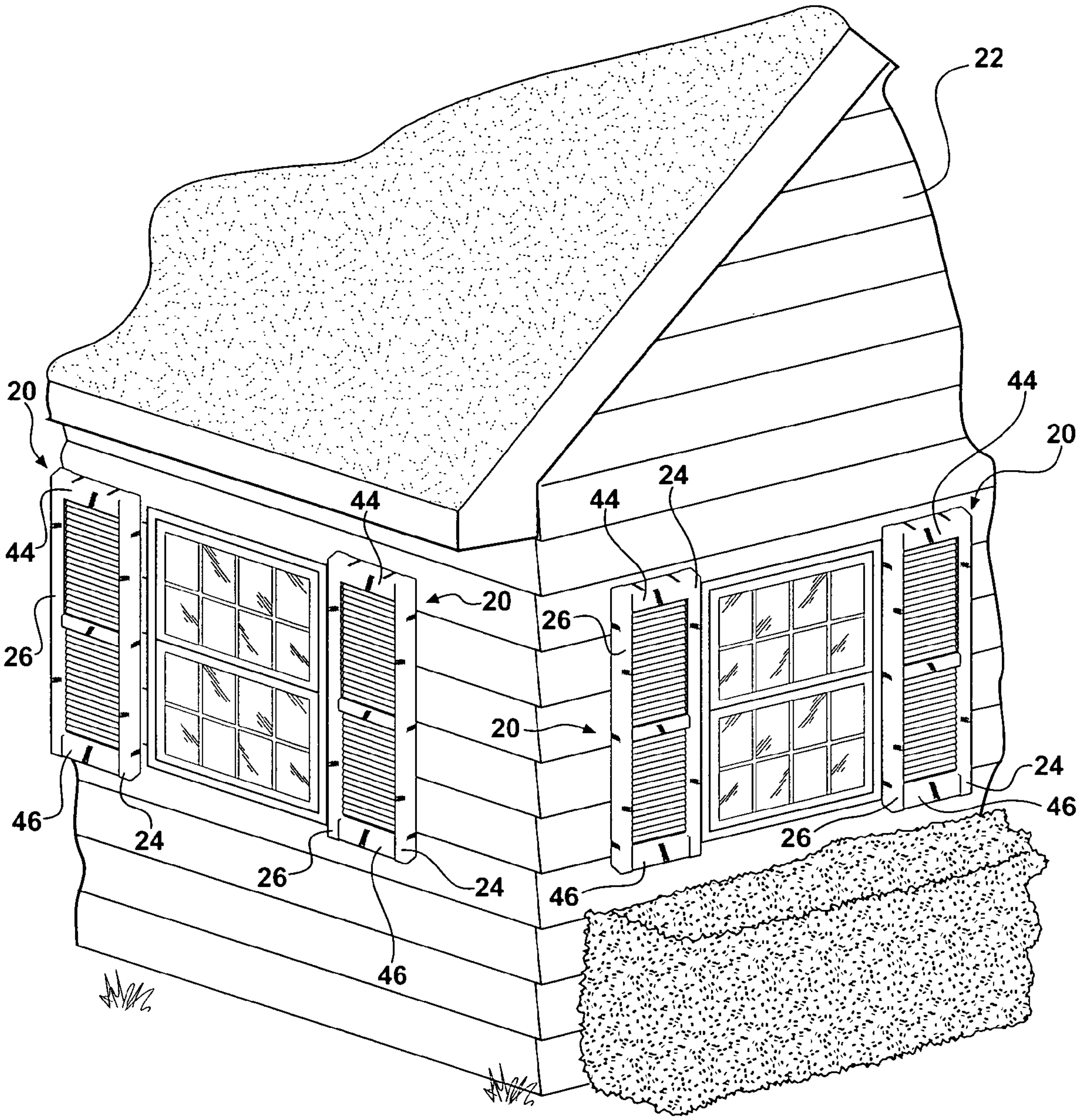
FIG. 1 is a partial perspective view of a building having a first embodiment of a plurality of shutter assemblies mounted thereon.

Referring to the Figures, wherein like numerals indicate corresponding parts throughout the several views, a shutter assembly 20 for mounting adjacent an opening of a building 22 is generally shown in FIG. 1. Preferably, the shutter assembly 20 is made of a combination of medium density fiberboard (MDF), extruded polyvinyl chloride (PVC) plastic, injection molded acrylonitrile butiadene styrene (ABS) plastic, and/or pultruded fiberglass reinforced plastic (FRP). However, one of ordinary skill in the art appreciates that other materials or processes may be used.

Figure 2:
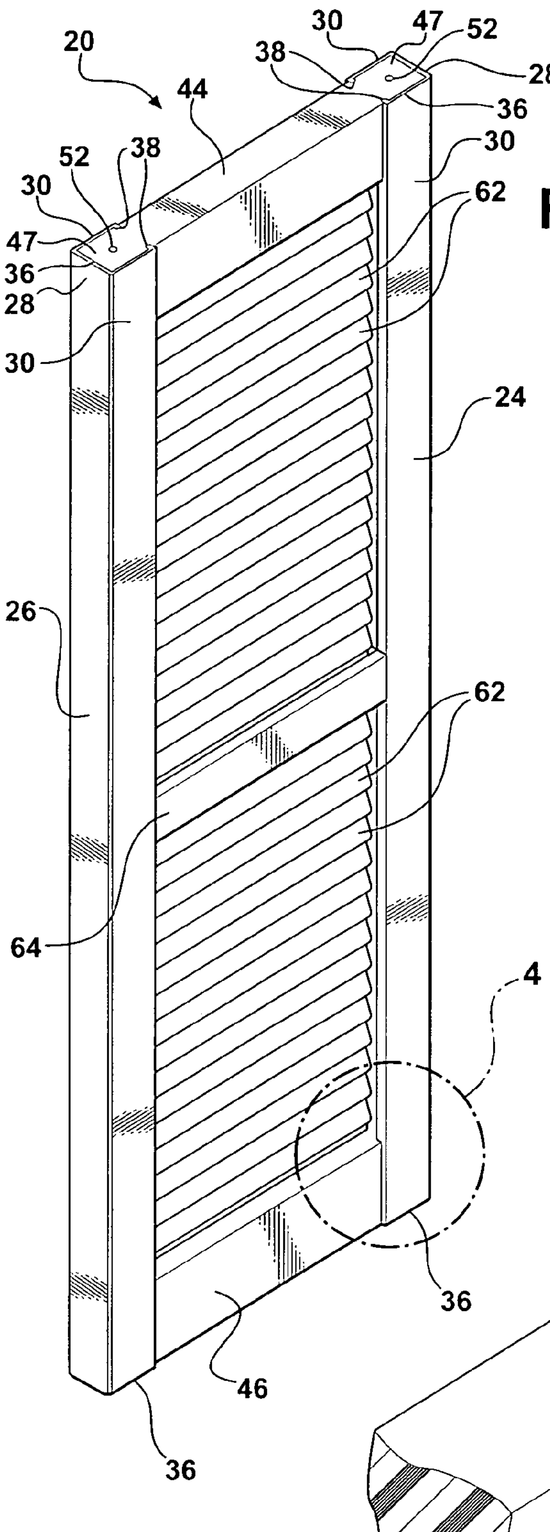
FIG. 2 is a perspective view of the first embodiment of the shutter assembly commonly referred to as a louvered shutter.
Figure 3:
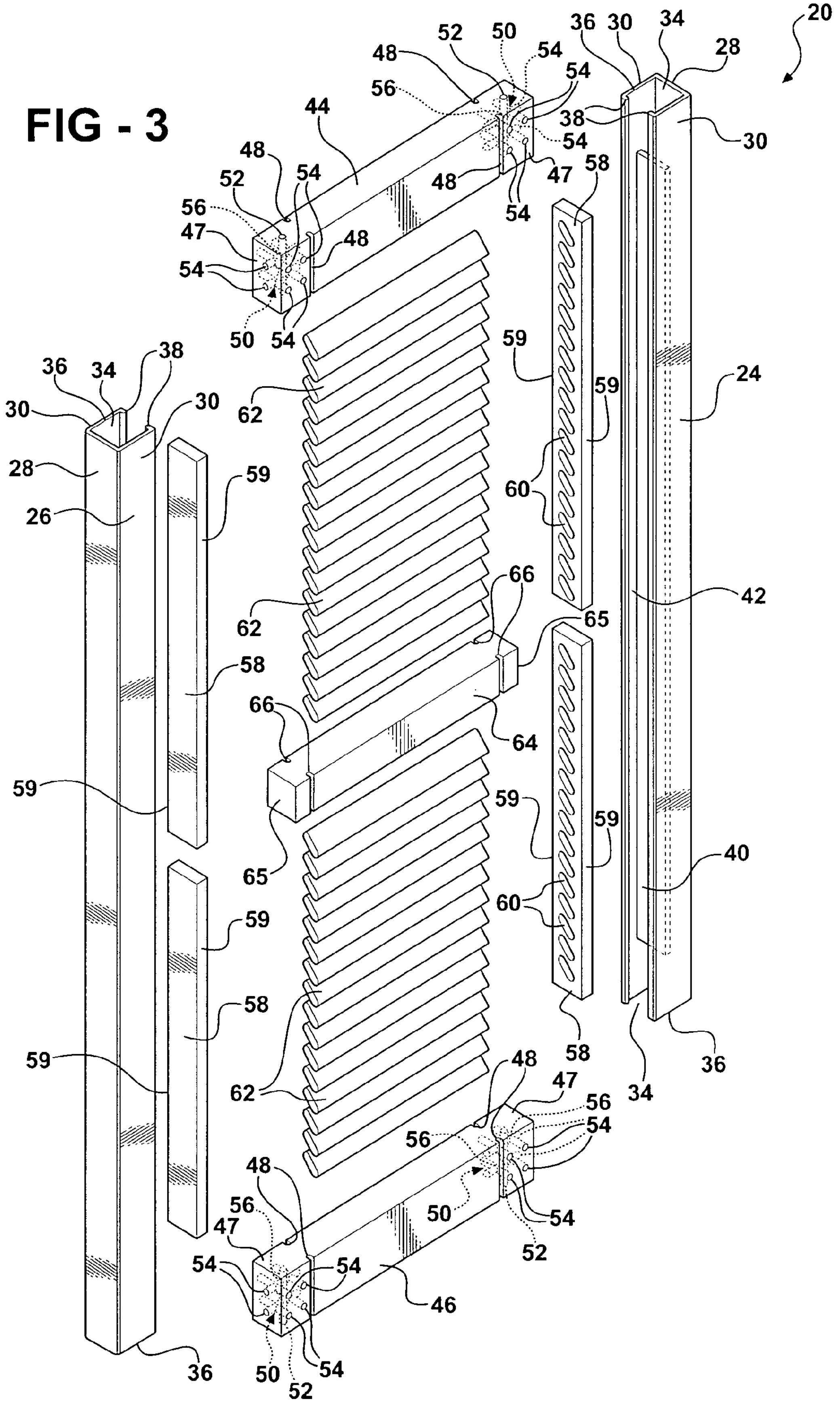
FIG. 3 is an exploded view of the louvered shutter.

A first embodiment of the shutter assembly 20 is shown in FIGS. 1, 2, and 3 and commonly referred to as a louvered shutter. The shutter assembly 20 includes a right stile 24 and a left stile 26 disposed in a spaced and parallel opposing relationship with one another. The right stile 24 is preferably a mirror image of the left stile 26. Each of the stiles 24, 26 have a U-shaped cross section presenting a base 28 and side walls 30. The side walls 30 extend from the base 28 to spaced distal edges to define a channel 34 open at each end 36 of the respective stiles 24, 26. The stiles 24, 26 have a flange 38 extending inwardly into the channel 34 from each of the distal edges of the side walls 30. The stiles 24, 26 have a divider 40 parallel and spaced from the flanges 38 for defining an elongated pocket 42 with the flanges 38. The divider 40 terminates in a spaced relationship to each of the open ends 36 of the stiles 24, 26. Preferably, the stiles 24, 26 are formed of a pultruded FRP. Alternatively, the stiles 24, 26 may be formed of a composite material, an extruded PVC plastic, MDF, wood, or any other acceptable material or process known in the art.

The shutter assembly 20 further includes a top rail 44 and a bottom rail 46 extending in a spaced and parallel opposing relationship between the bases 28 of the stiles 24, 26. Each of the rails 44, 46 have opposing ends 47 and the top rail 44 is preferably a mirror image of the bottom rail 46. The rails 44, 46 define a groove 48 spaced from each end 47 of each of the rails 44, 46 for receiving the flanges 38 of the stiles 24, 26 therein. The top rail 44 is disposed in one of the open ends 36 of each of the stiles 24, 26 and the bottom rail 46 is disposed in the other open ends 36 of each of the stiles 24, 26 so that each of the rails 44, 46 fill the space between the adjacent open ends 36 and the dividers 40 of the stiles 24, 26. Preferably, the rails 44, 46 are formed of PVC or MDF and cut and machined to the appropriate size. It is contemplated that the rails 44, 46 may be extruded or formed of any other acceptable material or process known in the art.

Figure 4:
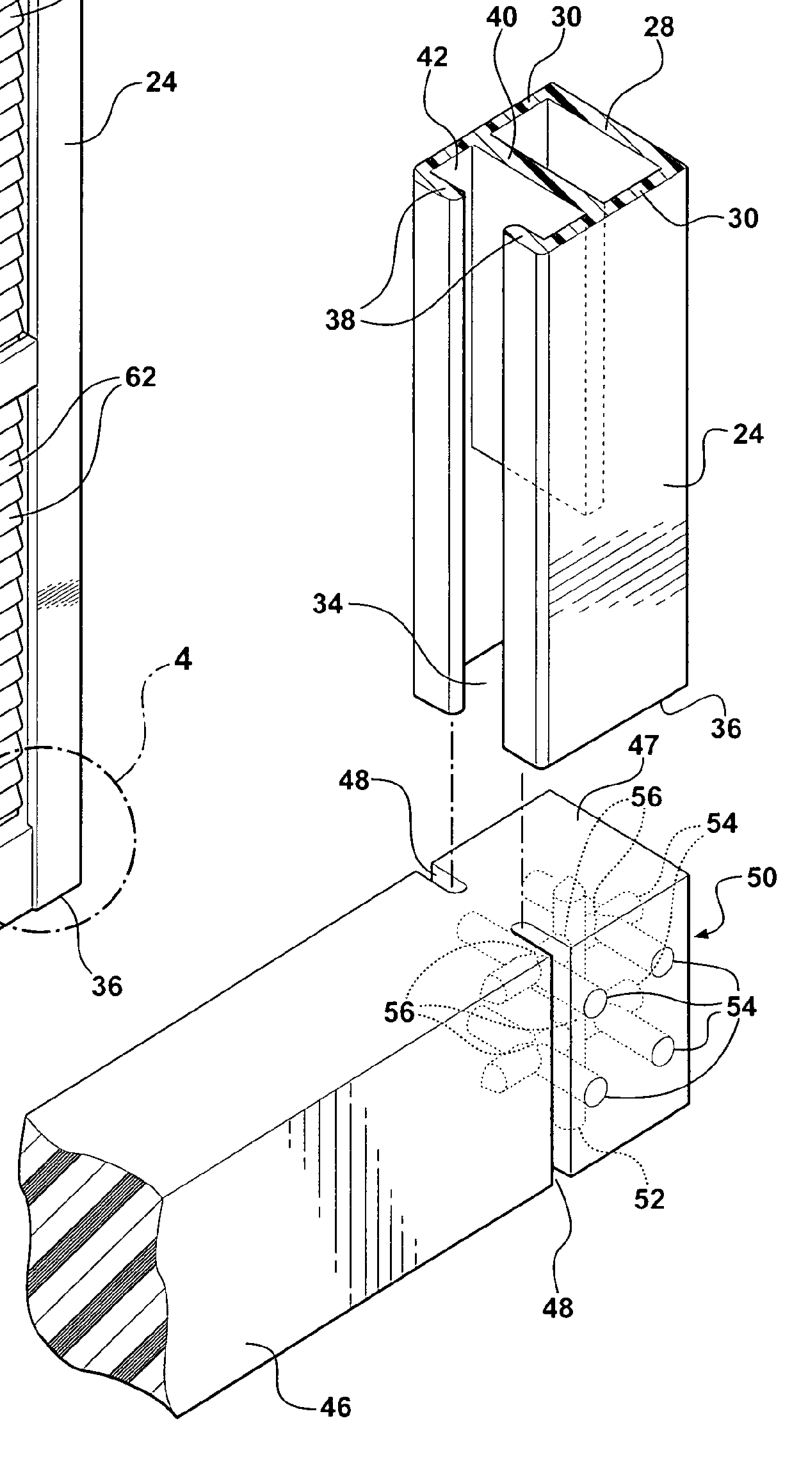
FIG. 4 is an exploded view of a right stile and a bottom rail having a glue manifold.

As best shown in FIGS. 3 and 4, each of the rails 44, 46 define a glue manifold generally shown at 50. The glue manifold 50 is disposed in each of the respective ends 47 of the rails 44, 46 for distributing an adhesive onto the rails 44, 46 and into the channels 34 to secure the rails 44, 46 to the stiles 24, 26. The glue manifold 50 includes an injection port 52 open to each of the open ends 36 of the stiles 24, 26. The glue manifold 50 further includes a plurality of outlet ports 54 opening to the side walls 30 and the base 28 of each of the stiles 24, 26. More specifically, the outlet ports 54 are spaced apart from each other for evenly distributing the adhesive onto each of the ends 47 of the rails 44, 46 to create a strong adhesive bond between the rails 44, 46 and the stiles 24, 26. A plurality of distribution passages 56 interconnect the injection port 52 and the outlet ports 54 of the glue manifold 50. However, it is contemplated that there may be one outlet port 54, one distribution passage 56, and more than one injection port 52. At least one of the outlet ports 54 may be disposed in each of the grooves 48 of the rails 44, 46 for distributing the adhesive into the grooves 48 and adhering the flanges 38 of the stiles 24, 26 to the rails 44, 46. The injection port 52 and the outlet ports 54 open to the base 28 of the stiles 24, 26 are blind holes.

The injection port 52, the outlet ports 54, and the distribution passages 56 are preferably drilled into the rails 44, 46. Alternatively, the injection port 52, the outlet ports 54, and the distribution passages 56 may be formed as the rails 44, 46 are manufactured, by any acceptable process known in the art. The injection port 52 has a cross sectional area larger than the cross sectional area of the distribution passages 56 for facilitating the flow of the adhesive through the distribution passages 56. It is contemplated that any cross sectional area of the injection port 52 and the distribution passages 56 may be used to facilitate the distribution of the adhesive. Preferably, the adhesive used to adhere the top and bottom rails 44, 46 to the right and left stiles 24, 26 is a two part epoxy. However, one skilled in the art would appreciate that any acceptable adhesive may be used. After the adhesive is injected into the glue manifold 50, the injection port 52 on the rails 44, 46 may have putty or a similar material disposed in the injection port 52 for aesthetic purposes.

The shutter assembly 20 includes a plurality of bars 58 each having edges 59 disposed in the pocket 42 of the opposing side walls 30 for being retained in the stiles 24, 26. Each of the bars 58 presents at least one recess 60 facing outwardly between the flanges 38 of the side walls 30 of each of the stiles 24, 26. Preferably for the louvered shutter, the recess of the bars 58 is further defined as a plurality of the recesses 60 with each being elongated along an axis and disposed at an acute angle to the length of the stiles 24, 26. One skilled in the art will appreciate that the recesses 60 of the bars 58 in the right stile 24 are inverse to the recesses 60 of the bars 58 in the left stile 26. Preferably, the bars 58 are formed of injection molded PVC plastic. However, it is to be appreciated that the bars 58 may be formed of ABS plastic or any other acceptable material or processes.

At least one decorative member is supported in and extends between the recesses 60 of the bars 58 that are disposed in the opposing stiles 24, 26. For the louvered shutter, the decorative member is further defined as a plurality of slats 62 having a cross section complementary to the recesses 60 so that the recesses 60 receive the slats 62. The slats 62 are preferably formed of a pultruded FRP. It is contemplated that the slats 62 may be formed of an extruded PVC plastic, and any other acceptable material or process known in the art.

A mullion 64 having opposing ends 65 extends between the bars 58 in the stiles 24, 26. The mullion 64 is spaced between the open ends 36 of the stiles 24, 26. The mullion 64 defines a slot 66 spaced from each end 65 of the mullion 64 for receiving the flanges 38 of the stiles 24, 26 therein. The mullion 64 is disposed within the pocket 42 of the stiles 24, 26. However, one skilled in the art would appreciate that the mullion 64 is optional. Preferably, the mullion 64 is form of PVC or MDF and cut and machined to the appropriate size. It is contemplated that the mullion 64 may be extruded or formed of any other acceptable material or process known in the art.

After assembly, the shutter assembly 20 may be covered with a sealer, paint, and/or stain. The shutter assembly 20 may be secured to the building 22 by any appropriate means known in the art. As appreciated by those skilled in the art, hinges (not shown) may be disposed on the outside of the stiles 24, 26. The hinges permit pivotal rotation of the shutter assembly 20 from an open position to a closed position or conversely.

Figure 5:
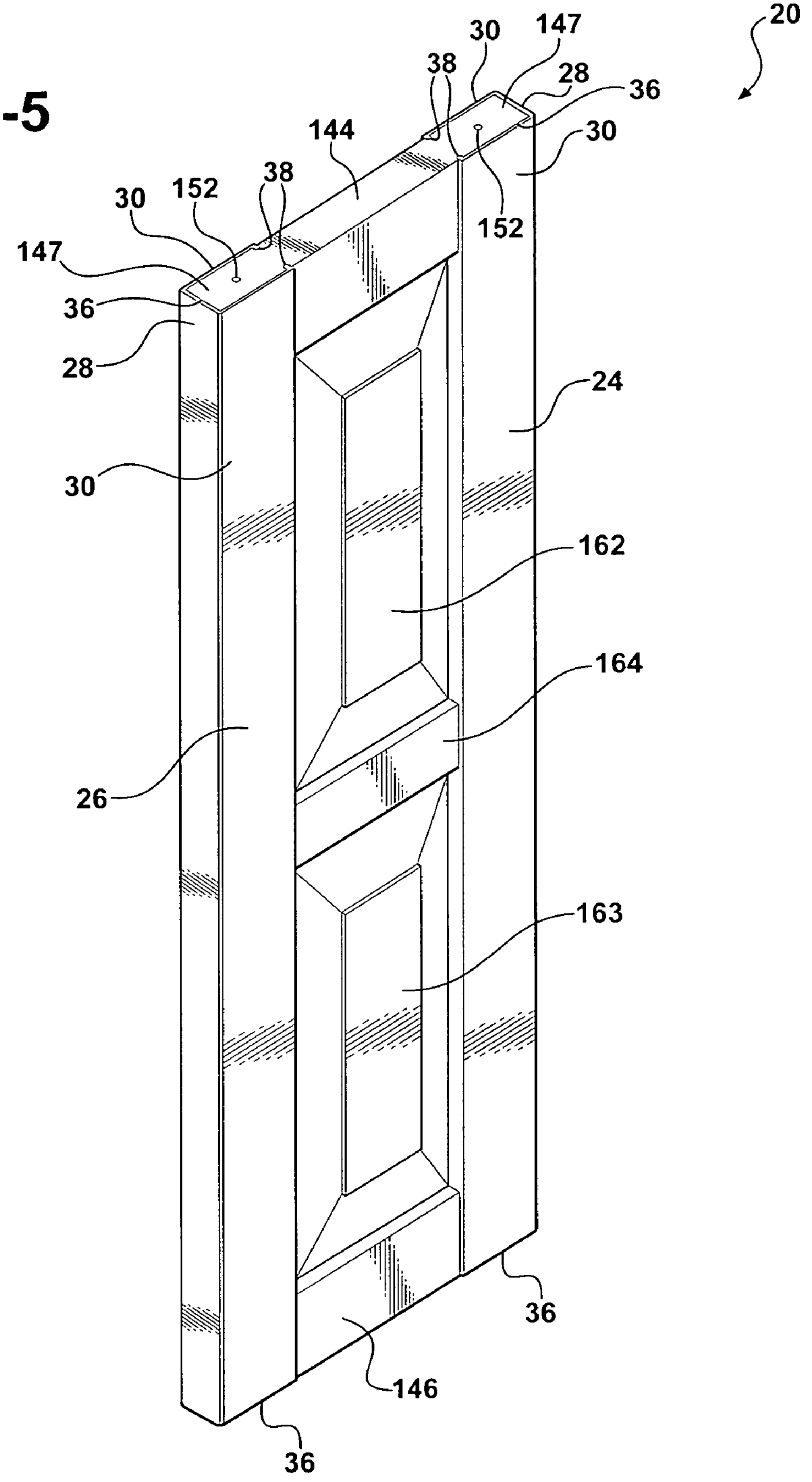
FIG. 5 is a perspective view of a second embodiment of the shutter assembly commonly referred to as a panel shutter.
Figure 6:
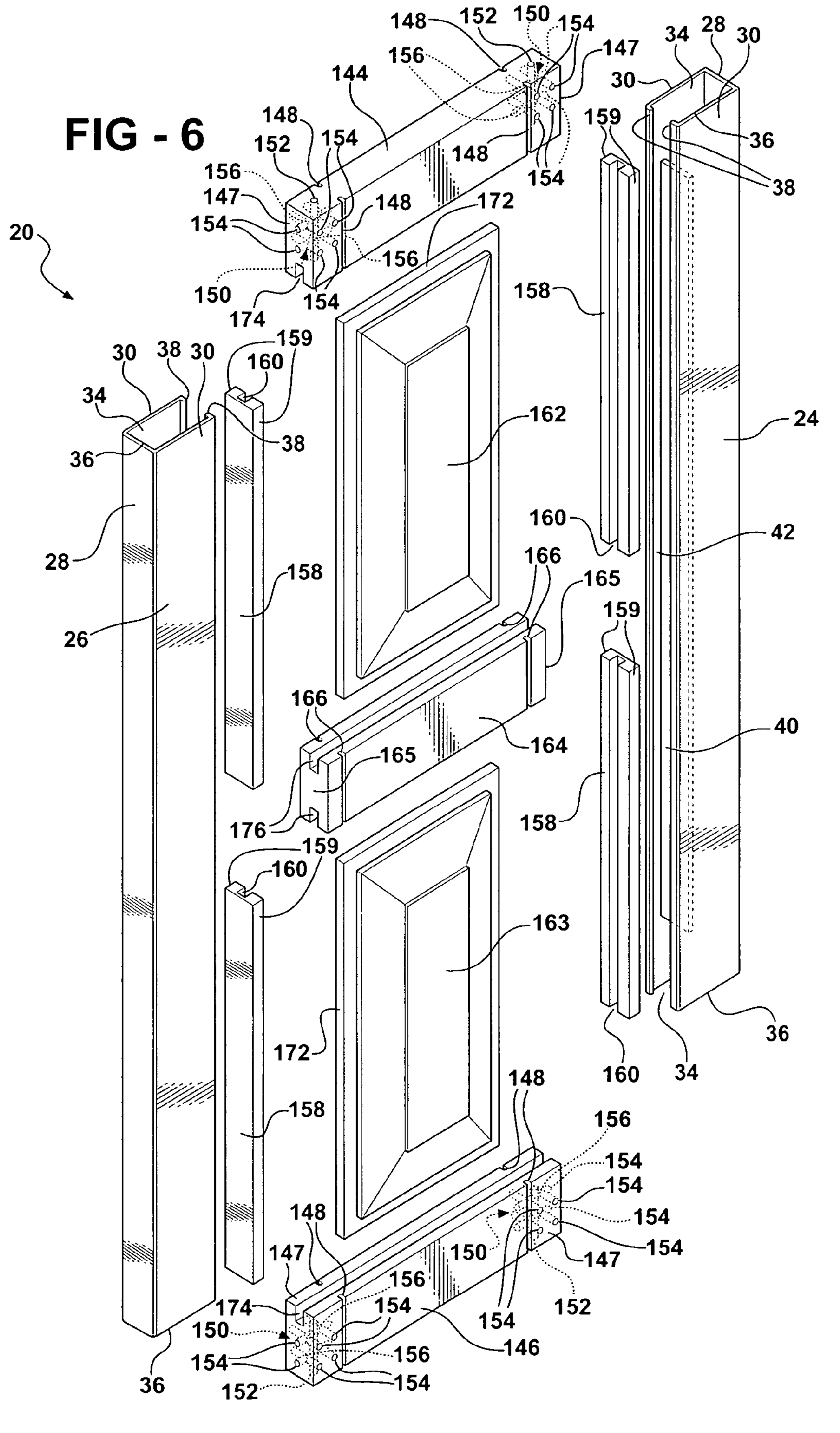
FIG. 6 is an exploded view of the panel shutter.

A second embodiment of the shutter assembly 20 is generally shown in FIGS. 5 and 6 and is commonly referred to as a panel shutter. The features of the first embodiment are considered applicable to the panel construction of the second embodiment. The features that are different include a plurality of bars 158, a top rail 144, a bottom rail 146, and a mullion 164 which are discussed below.

The primary distinction between the panel shutter and the louvered shutter is the decorative member for the panel shutter is defined by at least one panel. As shown in FIGS. 5 and 6, the panel shutter includes a first panel 162 and a second panel 163 disposed between the rails 144, 146 and the stiles 24, 26. However, it is to be appreciated that the panel shutter may be constructed with only a first panel 162 disposed between the rails 144, 146 and the stiles 24, 26. Each of the first and second panels 162, 163 have a periphery 172. The first panel 162 is disposed adjacent to the top rail 144 and a second panel 163 is disposed adjacent to the first panel 162 and the bottom rail 146. The panels 162, 163 are preferably formed of an extruded PVC. It is contemplated that the panels 162, 163 may be formed of a MDF, a pultruded FRP, or any other acceptable material or process known in the art.

Referring to FIG. 6, the bars 158 each have edges 159 disposed in the pocket 42 of the opposing side walls 30 for being retained in the stiles 24, 26. Each of the bars 158 presents a recess 160 facing outwardly between the flanges 38 of the side walls 30 of each of the stiles 24, 26. Each periphery 172 of the panels 162, 163 are supported in and extends between the recesses 160 of the bars 158 in the opposing stiles 24, 26. Preferably, the bars 158 are formed of injection molded PVC plastic. However, it is to be appreciated that the bars 158 may be formed of ABS or any other acceptable material or process known in the art.

The rails 144, 146 extend in a spaced and parallel opposing relationship between the bases 28 of the stiles 24, 26. Each of the rails 144, 146 have opposing ends 147 and the top rail 144 is preferably a mirror image of the bottom rail 146. The rails 144, 146 define a groove 148 spaced from each end 147 of each of the rails 144, 146 for receiving the flanges 38 of the stiles 24, 26 therein. Each of the rails 144, 146 define a panel recess 174 transverse to the grooves 148 and extending the length of each of the rails 144, 146 for receiving the periphery 172 of the first panel 162. Preferably, the rails 144, 146 are formed of PVC or MDF and cut and machined to the appropriate size. It is contemplated that the rails 144, 146 may be extruded or formed of any other acceptable material or process known in the art.

The mullion 164 having opposing ends 165 extends between the bars 58 in the stiles 24, 26. The mullion 164 is spaced between the open ends 36 of the stiles 24, 26. The mullion 164 defines a slot 166 spaced from each end 165 of the mullion 164 for receiving the flanges 38 of the stiles 24, 26 therein. The mullion 164 defines a pair of opposing panel recesses 176 transverse to the slots 166 with the panel recesses 176 extending the length of the mullion 164. The periphery 172 of the first panel 162 is disposed in the corresponding panel recess 176 of the mullion 164 and the panel recess 174 of the top rail 144 and the periphery 172 of the second panel 163 is disposed in the other panel recess 176 of the mullion 164 and the panel recess 174 of the bottom rail 146. However, one skilled in the art would appreciate that the mullion 164 is optional. Preferably, the mullion 164 is formed of PVC or MDF. It is contemplated that the mullion 164 may be extruded or formed of any other acceptable material or process known in the art.

Each of the rails 144, 146 define a glue manifold generally shown at 150. The glue manifold 150 is disposed in each of the respective ends 147 of the rails 144, 146 for distributing an adhesive onto the rails 144, 146 and into the channels 34 to secure the rails 144, 146 to the stiles 24, 26. The glue manifold 150 includes an injection port 152 open to each of the open ends 36 of the stiles 24, 26. The glue manifold 150 further includes a plurality of outlet ports 154 opening to the side walls 30 and the base 28 of each of the stiles 24, 26. More specifically, the outlet ports 154 are spaced apart from each other for evenly distributing the adhesive onto each of the ends 147 of the rails 144, 146 to create a strong adhesive bond between the rails 144, 146 and the stiles 24, 26. A plurality of distribution passages 156 interconnect the injection port 152 and the outlet ports 154 of the glue manifold 150. However, it is contemplated that there may be one outlet port 154, one distribution passage 156, and more than one injection port 152. At least one of the outlet ports 154 may be disposed in each of the grooves 148 of the rails 144, 146 for distributing the adhesive into the grooves 148 and adhering the flanges 38 of the stiles 24, 26 to the rails 144, 146. The injection port 152 and the outlet ports 154 open to the base 28 of the stiles 24, 26 are blind holes.

The injection port 152, the outlet ports 154, and the distribution passages 156 are may be drilled into the rails 144, 146. Alternatively, the injection port 152, the outlet ports 154, and the distribution passages 156 may be formed as the rails 144, 146 are manufactured, by any acceptable process known in the art. The injection port 152 has a cross sectional area larger than the cross sectional area of the distribution passages 156 for facilitating the flow of the adhesive through the distribution passages 156. It is contemplated that any cross sectional area of the injection port 152 and the distribution passages 156 may be used to facilitate the distribution of the adhesive. Preferably, the adhesive used to adhere the rails 144, 146 to the stiles 24, 26 is a two part epoxy. However, one skilled in the art would appreciate that any acceptable adhesive may be used. After the adhesive is injected into the glue manifold 150, the injection port 152 on the rails 144, 146 may have a putty or a similar material disposed in the injection port 152 for aesthetic purposes.

The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A shutter assembly for mounting adjacent an opening of a building, said assembly comprising:

a right stile and a left stile disposed in a spaced and parallel opposing relationship with one another and each having a U-shaped cross section presenting a base and side walls extending from said base to spaced distal edges to define a channel open at each end of said respective right and left stiles, a top rail and a bottom rail extending in a spaced and parallel opposing relationship between said bases of said right and left stiles and said top rail disposed in one of said open ends of each of said right and left stiles and said bottom rail disposed in said other open ends of each of said right and left stiles, and each of said top and bottom rails defining a glue manifold through which an adhesive is distributed into said channels for securing said top and bottom rails to said right and left stiles.

2. An assembly as set forth in claim 1 wherein said glue manifold includes an injection port open to each of said open ends of said right and left stiles and a plurality of outlet ports opening to said side walls and said base of said right and left stiles and a plurality of distribution passages interconnecting said injection port and said outlet ports.

3. An assembly as set forth in claim 2 wherein said injection port has a cross sectional area larger than the cross sectional area of said distribution passages for facilitating the flow of the adhesive through said distribution passages.

4. An assembly as set forth in claim 2 wherein said right and left stiles include a flange extending inwardly into said channel from each of said distal edges of said side walls.

5. A shutter assembly for mounting adjacent an opening of a building, said assembly comprising:

a right stile and a left stile disposed in a spaced and parallel opposing relationship with one another and each having a U-shaped cross section presenting a base and side walls extending from said base to spaced distal edges to define a channel open at each end of said respective right and left stiles, wherein said right and left stiles include a flange extending inwardly into said channel from each of said distal edges of said side walls, a top rail and a bottom rail extending in a spaced and parallel opposing relationship between said bases of said right and left stiles and said top rail disposed in one of said open ends of each of said right and left stiles and said bottom rail disposed in said other open ends of each of said right and left stiles, and each of said top and bottom rails defining a glue manifold for distributing an adhesive into said channels for securing said top and bottom rails to said right and left stiles, wherein said glue manifold includes an injection port open to each of said open ends of said right and left stiles and a plurality of outlet ports opening to said side walls and said base of said right and left stiles and a plurality of distribution passages interconnecting said injection port and said outlet ports, wherein said right and left stiles include a divider parallel and spaced from said flanges for defining an elongated pocket with said flanges and terminating in spaced relationship to said open ends of said right and left stiles.

6. An assembly as set forth in claim 5 wherein said top and bottom rails define a groove spaced from each end of each of said top and bottom rails for receiving said flanges of said right and left stiles therein and each of said top and bottom rails fill the space between said adjacent open ends and said dividers of said right and left stiles.

7. An assembly as set forth in claim 6 wherein at least one of said outlet ports is disposed in each of said grooves of said top and bottom rails for distributing the adhesive into said grooves and adhering said flanges of said right and left stiles to said top and bottom rails.

8. An assembly as set forth in claim 5 including a plurality of bars each having edges disposed in said pocket of said opposing side walls for being retained in said right and left stiles.

9. An assembly as set forth in claim 8 wherein each of said bars presents at least one recess facing outwardly between said flanges of said side walls of each of said right and left stiles.

10. An assembly as set forth in claim 9 including at least one decorative member supported in and extending between said recesses of said bars disposed in said opposing right and left stiles.

11. An assembly as set forth in claim 10 including a mullion extending between said bars in said right and left stiles and spaced between said open ends of said right and left stiles and defining a slot spaced from each end of said mullion for receiving said flanges of said right and left stiles therein.

12. An assembly as set forth in claim 10 including a plurality of said recesses with each being elongated along an axis disposed at an acute angle to the length of said right and left stiles.

13. An assembly as set forth in claim 12 wherein said decorative member includes a plurality of slats having a cross section complementary to said recesses.

14. An assembly as set forth in claim 10 wherein said decorative member is defined by at least one panel having a periphery disposed in said recesses of said bars.

15. An assembly as set forth in claim 14 wherein said top and bottom rails define a groove spaced from each end of each of said top and bottom rails for receiving said flanges of said right and left stiles therein and each of said top and bottom rails define a panel recess transverse to said grooves and extending the length of each of said top and bottom rails for receiving said periphery of said panel.

16. An assembly as set forth in claim 15 wherein said panel is further defined as a first panel disposed adjacent to said top rail and a second panel disposed adjacent to said first panel and said bottom rail.

17. An assembly as set forth in claim 16 including a mullion extending between said bars in said right and left stiles and spaced between said open ends of said right and left stiles and defining a slot spaced from each end of said mullion for receiving said flanges of said right and left stiles therein and said mullion defining a pair of opposing panel recesses transverse to said slots with said panel recesses extending the length of said mullion and said periphery of said first panel disposed in said corresponding panel recess of said mullion and said panel recess of said top rail and said periphery of said second panel disposed in said other panel recess of said mullion and said panel recess of said bottom rail.

18. A shutter assembly for mounting adjacent an opening of a building, said assembly comprising;

a right stile and a left stile disposed in a spaced and parallel opposing relationship with one another and each having a U-shaped cross section presenting a base and side walls extending from said base to spaced distal edges to define a channel open at each end of said respective right and left stiles, a flange extending inwardly into said channel from each of said distal edges of said side walls, a divider parallel and spaced from said flanges for defining an elongated pocket with said flanges and terminating in spaced relationship to said open ends of said right and left stiles, a plurality of bars each having edges disposed in said pocket of said opposing side walls for being retained in said right and left stiles, each of said bars presenting at least one recess facing outwardly between said flanges of said side walls of each of said right and left stiles, at least one decorative member supported in and extending between said recesses of said bars disposed in said opposing right and left stiles, a mullion extending between said bars in said right and left stiles and spaced between said open ends of said right and left stiles and defining a slot spaced from each end of said mullion for receiving said flanges of said right and left stiles therein, a top rail and a bottom rail extending in a spaced and parallel opposing relationship between said bases of said right and left stiles and said top rail disposed in one of said open ends of each of said right and left stiles and said bottom rail disposed in said other open ends of each of said right and left stiles, said top and bottom rails defining a groove spaced from each end of each of said top and bottom rails for receiving said flanges of said right and left stiles therein, each of said top and bottom rails filling the space between said adjacent open ends and said dividers of said right and left stiles, each of said top and bottom rails defining a glue manifold having an injection port open to each of said open ends of said right and left stiles and a plurality of outlet ports opening to said side walls and said base of said right and left stiles and a plurality of distribution passages interconnecting said injection port and said outlet port for distributing an adhesive into said channels for securing said top and bottom rails to said right and left stiles, at least one of said outlet ports being disposed in each of said grooves of said top and bottom rails for distributing the adhesive into said grooves and adhering said flanges of said right and left stiles to said top and bottom rails, and said injection port having a cross sectional area larger than the cross sectional area of said distribution passages for facilitating the flow of the adhesive through said distribution passages.

19. An assembly as set forth in claim 18 including a plurality of said recesses with each being elongated along an axis disposed at an acute angle to the length of said right and left stiles.

20. An assembly as set forth in claim 19 wherein said decorative member includes a plurality of slats having a cross section complementary to said recesses.

21. An assembly as set forth in claim 18 wherein said decorative member is defined by at least one panel having a periphery disposed in said recesses of said bars.

22. An assembly as set forth in claim 21 wherein each of said top and bottom rails define a panel recess transverse to said grooves and extending the length of each of said top and bottom rails for receiving said periphery of said panel.

23. An assembly as set forth in claim 22 wherein said panel is further defined as a first panel disposed adjacent to said top rail and a second panel disposed adjacent to said first panel and said bottom rail.

24. An assembly as set forth in claim 23 wherein said mullion defines a pair of opposing panel recesses transverse to said slots with said panel recesses extending the length of said mullion and said periphery of said first panel disposed in said corresponding panel recess of said mullion and said panel recess of said top rail and said periphery of said second panel disposed in said other panel recess of said mullion and said panel recess of said bottom rail.

* * * * *